United States Patent [19]
Wilson

[11] 3,994,534
[45] Nov. 30, 1976

[54] ANTI-SKID BRAKING SYSTEMS FOR VEHICLES WITH WHEEL DRIVEN PUMPS

[75] Inventor: Alexander John Wilson, Sutton Coldfield, England

[73] Assignee: Girling Limited, Birmingham, England

[22] Filed: Feb. 19, 1975

[21] Appl. No.: 550,995

[30] Foreign Application Priority Data
Feb. 21, 1974 United Kingdom............... 8008/74

[52] U.S. Cl. ............................... 303/10; 303/21 F
[51] Int. Cl.[2]................ B60T 8/087; B60T 13/16
[58] Field of Search ............... 303/21 F, 10, 21 AF, 303/61–63, 68–69, 92, 113, 114, 115, 116, 117; 188/181 A

[56] References Cited
UNITED STATES PATENTS

| | | |
|---|---|---|
| 3,514,162 | 5/1970 | Erlebach et al. ................. 303/21 F |
| 3,574,416 | 4/1971 | Skoyles............................. 303/21 F |
| 3,667,816 | 6/1972 | Harned............................. 303/21 F |
| 3,743,363 | 7/1973 | Hodge et al. ..................... 303/21 F |

Primary Examiner—Trygve M. Blix
Assistant Examiner—Jesus D. Sotelo
Attorney, Agent, or Firm—Scrivener Parker Scrivener and Clarke

[57] ABSTRACT

In an hydraulically-operated braking system for vehicles a supply of hydraulic fluid under pressure from a pump is utilized for applying a wheel brake, and the pump is responsive to rotation of the braked wheel so that the brake applying force is dependent upon the speed of rotation of the wheel and the wheel is automatically prevented from locking, and the system incorporates an hydraulic accumulator adapted to define a reservoir of high pressure for providing an instantaneous supply of high pressure fluid to apply the brake.

7 Claims, 2 Drawing Figures

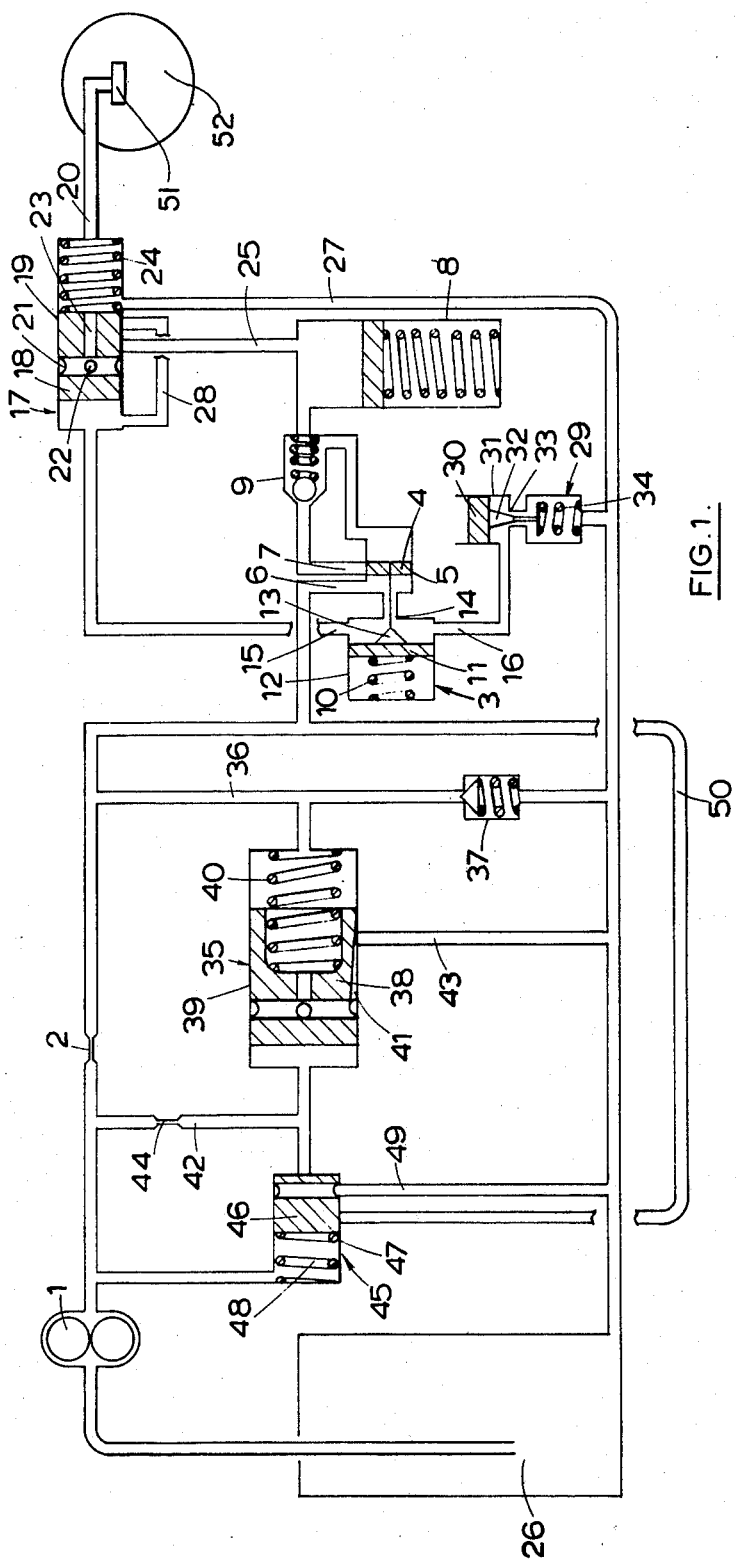
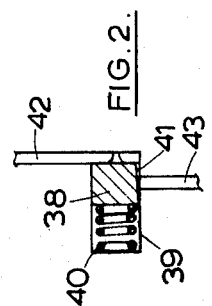
FIG.1.
FIG.2.

ANTI-SKID BRAKING SYSTEMS FOR VEHICLES WITH WHEEL DRIVEN PUMPS

This invention relates to improvements in hydraulically-operated braking systems for vehicles of the kind in which at least one brake is adapted to be applied in response to a supply of hydraulic fluid under pressure from a pump, and the pump is responsive to rotation of a wheel so that a brake applying force is dependent upon the speed of rotation of the wheel and the wheel is automatically prevented from locking.

In known braking systems of the kind set forth a time delay may occur whilst the pump is generating within the system sufficient pressure to apply the brakes. Such a delay may be considerable in systems for operating large brakes where it is inconvenient to utilise a large pump adapted to operate at a high delivery rate when the speed of the vehicle is high.

According to our invention an hydraulically operated braking system of the kind set forth incorporates an hydraulic accumulator adapted to define a reservoir of high pressure for providing an instantaneous supply of high pressure fluid to apply the brake.

The hydraulic accumulator is connected to the brakes through a brake control valve of which the operation is controlled by the pressure from the pump thereby ensuring that operation of the brake is dependent upon the speed of rotation of the wheel.

Preferably, by-pass means are provided for by-passing the brake control valve so that the pressure from the pump can be applied directly to the brake in the event of exhaustion of pressure in, or failure of, the hydraulic accumulator.

The accumulator is charged between brake applications by the pressure from the pump which is supplied to the accumulator through a pressure regulating valve so constructed and arranged that when the brake is applied communication between the pump and the accumulator is cut-off, and the pump pressure is solely applied to the brake control valve.

BRIEF DESCRIPTION OF THE DRAWINGS

One embodiment of our invention is illustrated in the accompanying drawings in which:

FIG. 1 is a layout of an hydraulically operated braking system for a vehicle; and FIG. 2 shows a modified construction of orifice for the proportioning valve incorporated in the braking system.

In the hydraulically-operated braking system illustrated in the drawings a high pressure hydraulic pump 1 is driven from a wheel of the vehicle. The pump 1 supplies fluid through a fixed orifice 2 to a pressure regulating valve 3. The pressure regulating valve 3 comprises a piston 4 working in a bore 5 to control communication between a radial inlet port 6 from the pump 1 and a radial outlet port 7 leading to an hydraulic accumulator 8 through a one-way valve 9. The end of the piston 4 remote from the port 6 is exposed to pressure in the accumulator 8 and is urged in a direction to oppose that pressure by means of a spring 10 acting on a piston 11 which works in a cylinder 12 of a diameter greater than that of the bore 5. The piston 11 includes a head 13 for regulating the flow through an orifice 14 normally connecting the bore 5 with the cylinder 12. The cylinder 12 is provided with connections 15 and 16.

An actuator 51 for a brake 52 on the wheel driving pump 1 is adapted to be operated by the supply of hydraulic fluid controlled by a brake control valve 17. The control valve 17 comprises a piston 18 working in a cylinder 19 which is connected at one end to the outlet connection 15. The opposite end of the cylinder 19 has an outlet passage 20 for connection to the brake actuator. The piston 18 has an annular groove 21 connected to the end of the cylinder 19 which is adjacent to the outlet passage 20 through a diametrical passage 22 and an axial bore 23. Normally the piston 18 is held by means of a spring 24 in the inoperative position shown in which communication with the accumulator 8 through a passage 25 is cut-off, and the end of the cylinder 19 containing the outlet passage 20 is connected to a reservoir 26, for supplying hydraulic fluid to the pump 1, through a return conduit 27. In this position the piston 18 also cuts-off communication through a by-pass passage 28 between the outlet connection 15 and a point in the cylinder 19 between the passage 25 and the return line 27.

The outlet connection 16 is connected to the return line 27 through a brake pressure actuating valve 29. The valve 29 comprises a valve member 30 working in a bore 31 and having a tapered portion 32 for controlling the flow through a seating 33. A spring 34 urges the valve member 30 in a direction to open a passage through the seating 33 in opposition to load from the brake pedal or pressure from a pedal-operated master cylinder which is adapted to be applied to the opposite end of the valve member 30.

The fluid from the fixed orifice 2 is also applied to one end of a proportioning valve 35 through a pipe-line 36 which is also connected to the return line 27 through a pressure relief valve 37. The proportioning valve 35 comprises a piston 38 working in a bore 39 and normally urged by a spring 40 in a direction to cut-off communication through an orifice 41 between a passage 42 between the pump 1 and the orifice 2 and a pipe-line 43 connected to the return line 27. A damping orifice 44 is provided in the passage 42.

A dump valve 45 in series with the proportioning valve 35 comprises a piston 46 working in a cylinder 47 and normally urged by a spring 48 and the pressure of the pump 1 in a direction to cut-off communication between the passage 42 and a pipe-line 49 connected to the return line 27, and between the passage 42, the pipe-line 49, and the pressure regulating valve 3 through a pipe-line 50.

On starting the spring 10 holds the head 13 of the pressure regulating valve 3 in an advanced position to close the orifice 14. Thus, when the wheel is rotating, the pump 1 pumps fluid through the orifice 2 and to the accumulator 8 through the pressure regulating valve 3 and the one-way valve 9. A leak path is provided through the valve 3 and around the head 13 when in the closed position so that pressure liquid also flows to the brake control valve 17 and the brake pressure actuating valve 29. This continues charging the accumulator 8 until the load due to the pressure acting on the piston 4 exceeds the loading in the spring 10 and the leakage through the valve 3 initiates a pressure differential across the piston 4 which then moves its full travel against the force in the spring 10. The piston 4 then cuts off flow through the port 7 and the excess fluid is returned, at low pressure, to the reservoir 26 through the brake pressure actuating valve 29 and the return line 27.

When the master cylinder is operated to apply the brakes, the tapered portion 32 of the head 30 cuts off flow through the seating 33. This causes the pressure in the cylinder 19 of the brake control valve 17 to rise with the result that the piston 18 is advanced in the cylinder 19, initially to isolate the cylinder 19 from the reservoir 26 by closing the connection with the return line 27, and subsequently to place the accumulator 8 in communication with the actuator 51 through the passage 20 and thus the passages 22 and 23. The pressure applied to the actuator 51 is regulated by the pressure drop across the brake pressure actuating valve 29. Charging of the accumulator 8 during braking is prevented by the pressure acting on the piston 11 which holds the head 13 away from the orifice 14 with the piston 4 closing the port 7. Charging can only occur when pressure in the brake actuating valve is low so that the spring 10 can urge the head 13 into the advanced position described above.

The proportioning valve 35 is sensitive to the pressure drop across the fixed orifice 2 and, in a known manner (for example as described in U.S. Pat. Nos. 3,661,427 and 3,743,363), adopts a position which is a function of the speed of rotation of the pump 1.

Since any rapid reduction in the speed of rotation of the pump 1 causes an immediate drop in flow, the damping orifice 44 is provided to ensure that the consequent drop of pressure across the orifice 2 is transmitted immediately to both the proportioning valve 35, and the dump valve 45. Upon return movement of the piston 38 under the influence of the spring 40, the dump valve 35 is adapted to open to connect the portion of the system between the orifice 2 and the actuating valve 29 to the reservoir 26. The pressure applied to the piston 18 is thus reduced and the braking effort is also reduced with the fluid in the outlet 20 being first accommodated within the space defined by the travel of the piston 18 and secondly returned to the reservoir through the return line 27.

When rotation of the wheel is resumed, re-application of the brakes is accomplished, either directly by movement of the piston 18 within the cylinder 19, or by an additional supply from the accumulator 8 as described above.

Conveniently, as illustrated, the piston 18 is provided with a large overlap to reduce to a minimum the depletion of the accumulator 8 during any one brake application.

During a brake application the pump pressure acts on the piston 11 to urge the head 13 away from the orifice 14. Thus all the pump pressure is used for the brake application and the accumulator 8 can not be recharged.

Should the accumulator 8 become depleted by repeated braking or malfunction, the pump pressure advances the piston 18 in the cylinder 19 through a greater distance to open the by-pass passage 28. Thus fluid under pressure is supplied to the brakes directly from the pump 1 through the passages 22 and 23. In such a condition the accumulator 8 is isolated by the pressure regulating valve 5 and the piston 18 which closes the passage 25.

In a preferred construction the pump 1 comprises at least one plunger operated by a cam ring mounted on the wheel. This has the advantage of providing pulsations in pressure which serve to prevent hydraulic lock effects occurring in valves of the spool type which it is convenient to use in the system.

The orifice 41 in the proportioning valve 35 may be of the form shown in FIG. 2 where the aperture is varied in response to different brake pressures. The orifice is large when the pressure in the system is high. This allows the proportioning valve 35 to accommodate the rapid changes in position associated with high decelerations which occur on good dry surfaces. Control pressures on low friction surfaces will remain low since wheel slip occurs easily. Under such conditions the smaller size of the orifice 41 ensures that the movements of the piston 38 are slow. This allows the long stop period to be controlled.

We claim:

1. An hydraulically-operated anti-skid braking system for a vehicle comprising at least one brake for braking a wheel, a pump responsive at all times to rotation of said wheel, control means for supplying hydraulic fluid under pressure from said pump to said brake to apply said brake whereby a brake applying force is dependent at all times on the speed of rotation of said wheel and said wheel is automatically prevented from locking, and an hydraulic accumulator supplied with fluid under pressure from said pump, said accumulator defining a reservoir of high pressure fluid for providing an instantaneous supply of high pressure fluid to apply the said brake.

2. A braking system as claimed in claim 1, including a brake control valve through which said hydraulic accumulator is connected to said brake, operation of said control valve being controlled by pressure from said pump thereby ensuring that operation of said brake is dependent upon the speed of rotation of said wheel.

3. An hydraulically operated antiskid braking system for a vehicle comprising at least one brake for braking a wheel, a pump responsive to rotation of said wheel, control means for supplying hydraulic fluid under pressure from said pump to said brake to apply said brake whereby a brake applying force is dependent on the speed of rotation of said wheel and said wheel is automatically prevented from locking, and an hydraulic accumulator supplied with fluid under pressure from said pump, said accumulator defining a reservoir of high pressure fluid for providing an instantaneous supply of high pressure fluid to apply the said brake, including a brake control valve through which said hydraulic accumulator is connected to said brake, operation of said control valve being controlled by pressure from said pump thereby ensuring that operation of said brake is dependent upon the speed of rotation of said wheel, wherein by-pass means are provided for by-passing said brake control valve so that the pressure from said pump can be applied directly to said brake in the event of exhaustion of pressure in, or failure of, said hydraulic accumulator.

4. An hydraulically operated antiskid braking system for a vehicle comprising at least one brake for braking a wheel, a pump responsive to rotation of said wheel, control means for supplying hydraulic fluid under pressure from said pump to said brake to apply said brake whereby a brake applying force is dependent on the speed of rotation of said wheel and said wheel is automatically prevented from locking, and an hydraulic accumulator supplied with fluid under pressure from said pump, said accumulator defining a reservoir of high pressure fluid for providing an instantaneous supply of high pressure fluid to apply the said brake, including a brake control valve through which said hydraulic accumulator is connected to said brake, operation of said control valve being controlled by pressure from said pump thereby ensuring that operation of said brake is dependent upon the speed of rotation of said wheel wherein a pressure regulating valve is interposed between said pump and said hydraulic accumulator.

5. An hydraulically operated antiskid braking system for a vehicle comprising at least one brake for braking a wheel, a pump responsive to rotation of said wheel, control means for supplying hydraulic fluid under pressure from said pump to said brake to apply said brake whereby a brake applying force is dependent on the speed of rotation of said wheel and said wheel is automatically prevented from locking, and an hydraulic accumulator suppled with fluid under pressure from said pump, said accumulator defining a reservoir of high pressure fluid for providing an instantaneous supply of high pressure fluid to apply the said brake, wherein a fixed orifice is disposed in a delivery line from said pump to said accumulator.

6. A braking system as claimed in claim 5, wherein a proportioning valve located on the downstream side of said fixed orifice and sensitive to pressure drop across said orifice is adapted to adopt a position which is a function of the speed of rotation of said pump, and a dump valve connected in series with said proportioning valve is responsive to said position of said proportioning valve, said dump valve being normally closed to isolate said delivery line on the downstream side of said fixed orifice from a return line to a reservoir for fluid, and rapid reduction in said speed of rotation of said pump with consequent immediate drop in flow altering the position of said proportioning valve which, in turn, opens said dump valve to connect said delivery line on the upstream side of said fixed orifice to said return line.

7. A braking system as claimed in claim 6, wherein a first line connects adjacent ends of said proportioning valve and said dump valve and a second line connects said first line to said delivery line on the upstream side of said fixed orifice, a damping orifice being incorporated in said second line to ensure that a drop in pressure across said fixed orifice is transmitted immediately to both said proportioning valve and said dump valve.

* * * * *